United States Patent Office 2,987,424
Patented June 6, 1961

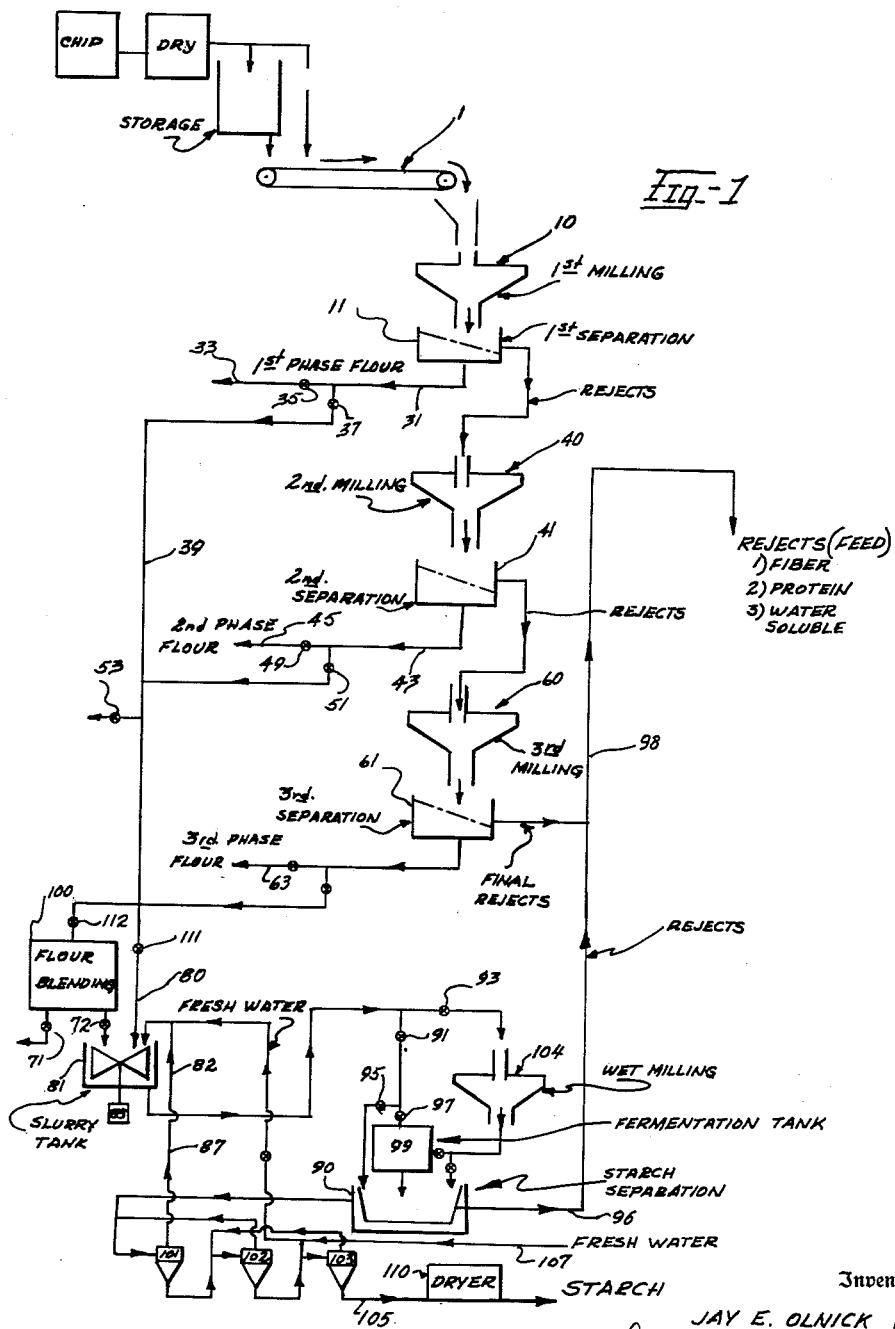

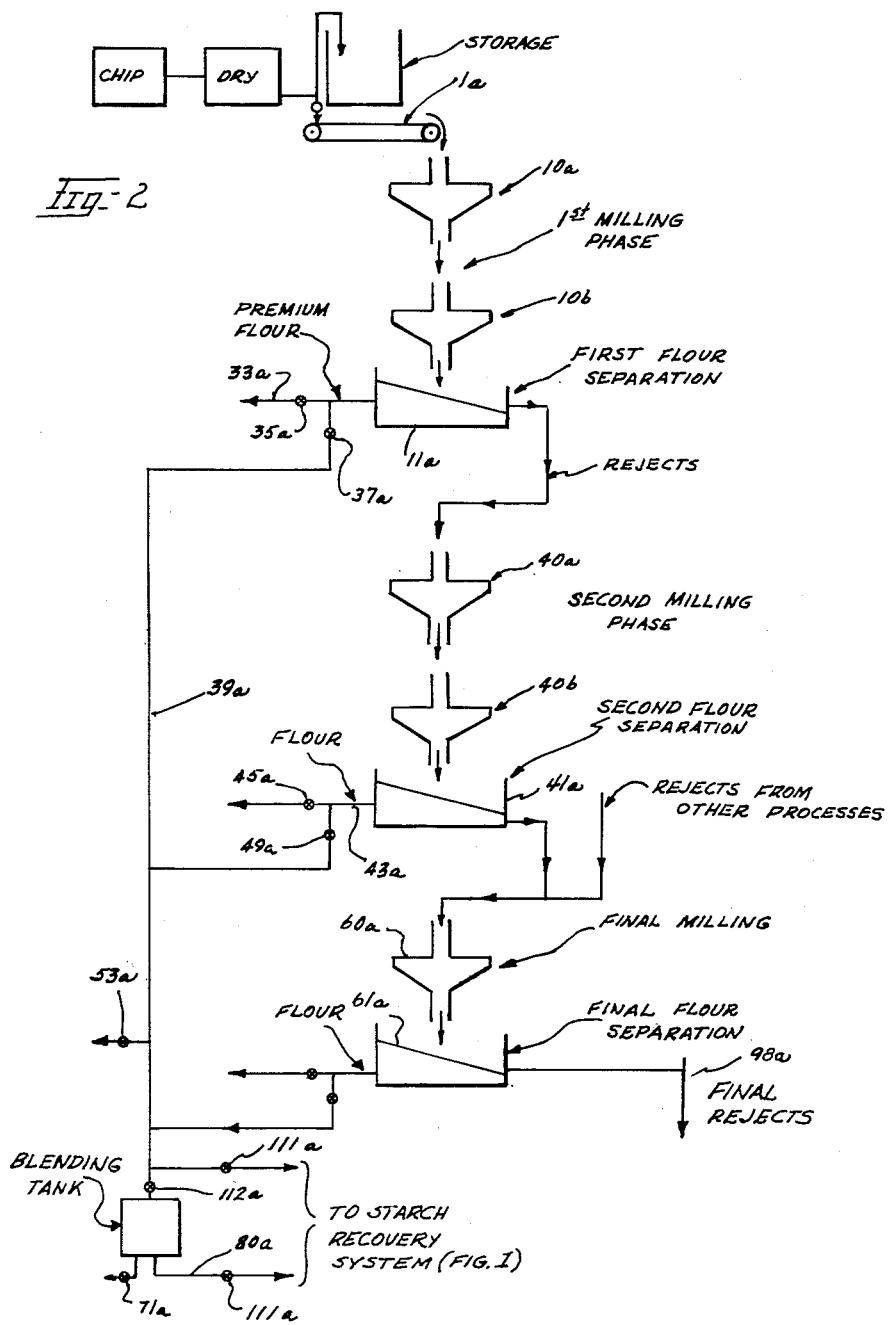

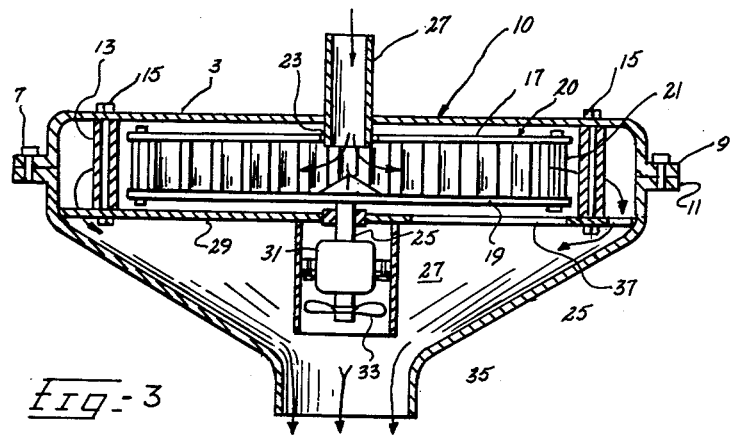
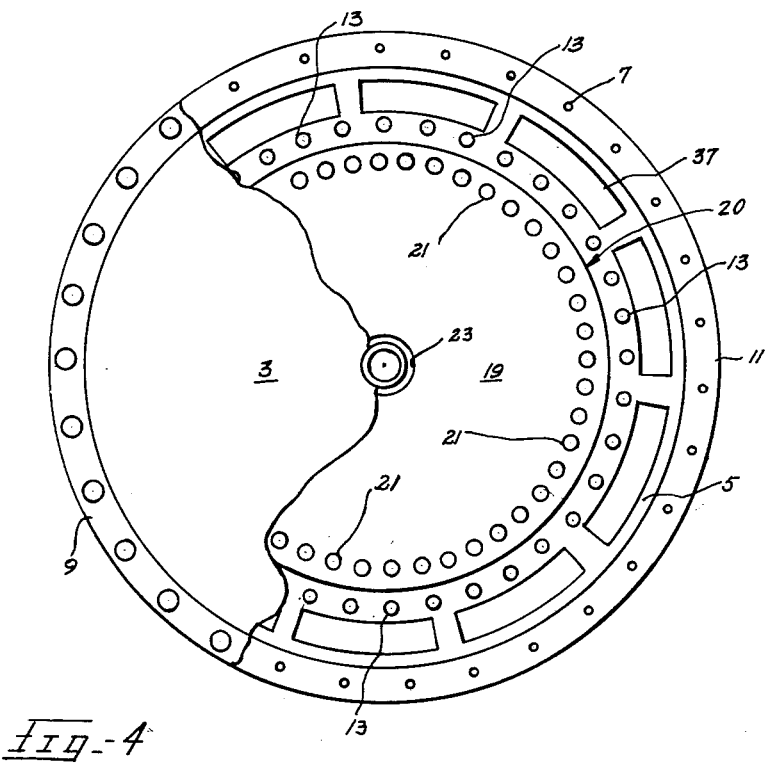

2,987,424
ROOT CROP FLOUR AND METHOD OF AND SYSTEM FOR MAKING SAME
Jay E. Olnick, Guadalajara, Mexico, assignor to The Champion Paper and Fibre Company, Hamilton, Ohio, a corporation of Ohio
Filed May 1, 1959, Ser. No. 810,301
15 Claims. (Cl. 127—67)

This invention is concerned in general with the production of starch from root crops. In particular, the invention is concerned with a method of and system for recovering starch and a unique starch containing product obtained by treatment of a suitable species of tuber. A suitable starting material may be selected from root crops such as cassava or tapioca, yams, potato, arrowroot, sago and the like. A particularly advantageous use of the present invention is in the recovery of starch from cassava, and in the following description reference will be made to the practice of the invention in processing such tubers although the invention is not so limited.

While there are in existence operations for recovering starch from cassava and other such materials known to have a starch content sufficient to warrant processing, such operations have not proven as economically feasible as might be desired. For this reason crops such as cassava have not attained their full economical significance in those areas of the world where conditions are most favorable for their growth. This condition has been brought about because of several factors: the nature of cassava, i.e., its tendency toward rapid degradation when harvested and not immediately processed, the expensive and slow hand labor processes that have been believed to be a necessary part of the processing, the inefficiency of the equipment used to perform milling of the raw material, and finally the crudeness, i.e., low starch and high tailings content of resultant products made from tapioca unless particular and expensive operations are used.

The present invention therefore, has for an object the development of a novel process and system for preparing a unique, high starch content flour.

A further object of the invention is to develop an economical process for the recovery of starch from root crops.

An additional object of the invention is to produce a premium quality starch containing product.

Still another object of the invention is to develop a process and system for the recovery of a premium quality root, i.e., tapioca flour as an intermediate product in a starch extraction operation.

Another object of the invention is to produce starch or a starch containing product at a minimum of cost while avoiding the difficulties generally associated with the production of starch from root crops, i.e., natural degradation which begins after harvest, and seasonal rather than continuous operation of such starch producing plants.

A still further object of the invention is to produce a root flour which is characterized in that it has been passed through a dry, in contradistinction to a wet milling process and which is further characterized in its exceptionally high starch to fibre content.

Still another object of the invention resides in a process for treating a root crop such as cassava wherein the total processing time is reduced to a minimum.

An additional object of the invention is to develop a starch recovery process for tubers wherein the time of exposure of the raw material to conditions favorable to its degradation is reduced to an absolute minimum.

The significance of the recited and other objects of the invention not specifically referred to but inherent therein, will become readily apparent when consideration is given to a comparison of the prior methods of processing root crops and the present invention.

In the prior processes for recovering starch from cassava and similar root crops, one difficulty experienced has been that resulting from the deterioration of the quality of the root due to action of natural enzymes contained therein. This enzyme action initiates, among other things, a pronounced darkening of the root and a general decomposition thereof, resulting in the recovery of inferior grades of useable starch products. To avoid this adverse effect, it has been the usual practice in the industry to pursue one of two courses both of which are only moderately successful. The first and probably the most widely practiced process is the so-called "wet milling" process wherein the harvested root is, as soon as possible, introduced into a wet milling apparatus, and subsequently the milled product is subjected to one of several varieties of separation systems wherein the starch is separated from tailings or that material foreign to the starch, i.e., fiber, protein, water solubles and the like. While wet milling processes are successful in that recovery of the available starch in the root is moderate, none the less this type of process is not particularly economical because the wet milling and water separation operations are comparatively slow and, in addition, it has been necessary to operate such plants seasonally because the roots do not store particularly well, as has been pointed out, and therefore have to be entirely processed directly after harvest. The second approach to the problem which does obviate to some extent the storage problem and the disadvantages of seasonal operation of recovery plants, resides in the use of dried chips as a starting material. The chips are dried by any suitable means at a temperature low enough to prevent cooking or gelling of the starch fraction contained therein. The dried chips will store reasonably well, and thus, if they can be processed to give sufficient starch yield, such a chip drying operation could be a successful answer to the mentioned problems. However, this system has not proven entirely satisfactory because the initial chipping and drying adds cost on an already costly process and does nothing to improve starch yield.

As an alternative to the wet milling of dry chips it has further been proposed to dry mill the chips in successive operations followed by a wet separation of the starch from the ground product. This method produces a high yield of starch from roots such as cassava which is known to contain up to 84% starch, but has not proven satisfactory for several reasons, one of which is high cost per unit of starch produced and another is the fact that usual dry milling results in the development of a gelatinous mass which clogs the usual grinders, for example the hammer or stone type, and further, a mass which is hard to handle even when ejected from the grinding medium.

The present invention contemplates a new approach to the problem, and the specified objects mentioned above may be attained by comminuting cassava root, preferably but not necessarily debarked and washed root, at harvest into chips of uniform thickness, not to exceed 3 mm. in thickness, drying the chips to not less than 10% nor more than 15% moisture content, thereafter subjecting the chips to the action of an impact mill, the mill operating at such a speed that the impact occurs when the chips attain a velocity of no less than 4000 nor greater than 10,000 meters per minute, preferably about 8300 meters per minute, within the mill, and thereafter screening the resultant material over a 150 to 200 mesh screen, obtaining therefrom a flour, a unique product, characterized in that it contains at least 89% to 95% starch and is usable as a foodstuff, subsequently passing the tailings obtained from the initial milling and screening phase to further dry impact milling and screening to recover additional starch therefrom, repeating the removal of the separated starch by screening and repeating the refinement of tailings, which also may include additional tailings as a raw material, to arrive at a "breaking point" where further refinement is no longer economical. Subsequently a portion or all of the starch yielded after the initial milling operation may be fed into a starch recovery system by slurrying in an appropriate slurry tank and thereafter passing the slurry through a series of separating steps including hydrocyclone and/or centrifugal separators, starch tables and the like, to remove fiber, protein and other residual material, enabling the production of a very pure starch product.

The process described may be practiced by providing multi-step grinding at each milling phase. It is not always necessary to do so, in fact in most cases at least one pass through the individual milling steps is sufficient.

In any event the success of the process is dependent upon the recovery of marketable high starch content flour directly from the first stage milling and the fact that dried chips of the mentioned moisture content can be stored indefinitely and can thereafter be impact milled to produce a product of the type described.

The process will now be described in detail. In such description reference will be made from time to time to the attached drawings appended to and forming a part of the specification and wherein FIG. 1 is a schematic view of one manner of practicing the invention, FIG. 2 is a further illustration in schematic form of a manner of practicing the process, FIG. 3 is an elevational sectional view of an impact milling machine exemplary of a milling device which may be used in practicing the invention, while FIG. 4 is a top view partially in sections of the apparatus illustrated in FIG. 3.

Referring to FIG. 1 it will be seen that the first step in the tapioca starch recovery process is the harvesting, chipping and drying of the crop. The chipping and drying operation may be carried out in any suitable location but preferably these steps will be performed at the source of the raw material, i.e., the farm. Since degradation of the harvest begins almost immediately it is most advantageous that the chipping and drying steps be effected with no greater lapse of time than forty-eight hours after harvest. By completing these steps within the specified time limit the spoilage of the harvest may be substantially reduced resulting in a much higher quality product.

The chipping operation may be carried out in any desired fashion. It is essential, however, that the chips be uniform and preferably of a thickness on the order of 1.5 to 3 mm. The necessity for uniformity in thickness will become apparent.

After the tapioca is chipped, the chips are dried to reduce their moisture content to not less than 10% and for most effective operation of the process, not more than 15% moisture content. There are, of course, machines available for drying. However, it has been found that successful drying can be carried out in the sun. This is possible because the chips being of uniform thickness will dry uniformly and, further, since the chips are on the order of 1.5 to 3 mm. in thickness, drying can be effected in a predictable time of exposure to the sun and without "cooking" of the root.

Once the chips are dried to the specified moisture content it has been found that they may be readily stored without spoilage. This fact is of significant economical importance. First, since the chips are storeable, it means that a starch processing plant of a fixed capacity may be used on a continuous basis, resulting in steady month-to-month operation, and, secondly, it means that the sources of the raw material are not limited solely to areas immediately adjacent the processing plant.

With the chips in a dried condition they may be used in two ways. As shown in FIG. 1 the dried chips may be stored in a suitable warehouse and used as needed; or they may be introduced directly into the next phase of the process; or combinations of stored and freshly dried chips may be used in this phase as may be found desirable.

The next phase of the process, as illustrated in FIG. 1 is the initial milling operation. The dried chips from storage or those freshly dried may be conveyed by any desired conveying system 1 to an impact milling device 10. Because of the fact that this milling operation is so essential to the process it will be described in detail, reference being made to FIGS. 3 and 4 during this detailed description, keeping in mind the fact that the tapicoa chips are dry, i.e., have a moisture content from 10% to 15% and are uniform, about 1.5 to 3 mm. in thickness.

Referring to FIGS. 3 and 4 it may be seen that the impact milling device is comprised of a two part housing 3 and 5, the upper part 3 being joined to the lower part 5 by means of a series of bolts 7 passing through mating peripheral flanges 9 and 11 respectively. The housings as a unit are generally annular in form when viewed from the top as in FIG. 4 and define a hollow interior. Within the interior and fixed between the housings 3 and 5 are a series of vertically disposed circumferentially spaced pin elements 13. The shape of these pin elements in cross section may assume various forms. For simplicity's sake, however, they are shown as being comprised of a plurality of sleeves held between the housings by bolts 15. These series of pins 13 thus define an annular cage. It will be noted further that the pins are spaced diametrically inwardly of the outer wall defined by housing parts 3 and 11.

Within the cage defined by pins 13 there is positioned a rotor assembly 20. This rotor assembly is comprised of two disc like members 17 and 19 in concentric, vertically spaced relation, and held in this assembled relationship by a series of spaced pins 21 disposed at their periphery. These pins 21 are similar to the pins 13 and are vertically disposed and circumferentially spaced. The top disc 17 is supported by lower disc 19 and differs therefrom in that it is provided with a central aperture 23. The lower disc 19, on the other hand, is directly mounted upon and supported by a shaft 25 such that the entire assembly defines a rotating cage.

As shown in FIGS. 3 and 4, the upper housing part 3 is provided with a tubular inlet 27 which comprises a tube having its lower end 29 extending into the interior chamber defined by housing parts 3 and 5 and terminating just below the plane of the disc 17 of rotor assembly 20. This lower end 29 projects into the opening 23 provided in disc 17.

It will be noted that the bottom housing part 5 actually defines two interior chambers. That described above which it forms with housing part 3, and a second chamber 27 disposed beneath the first chamber. The two chambers are separated by the common dividing wall 29 which serves, in addition to its dividing function, as a support for a housing 30 which encloses an electric motor 31. Motor 31 is connected to shaft 25 and thus is the prime mover for the rotor 20 on one hand, and may be further connected to a fan 33 on the other hand. Fan 33, if used, is arranged to blow an air stream downwardly toward an opening 35 of generally funnel-like configuration which defines an outlet from the apparatus to encourage exit of the milled material from the apparatus.

The rotor-containing chamber and the bottom chamber 27 are in communication with one another through a series of parts 37 provided in dividing wall 29.

The function of this apparatus is as will now be described, reference being made to the arrows in FIGS. 3 and 4 which are indicative of material flow through the apparatus. Material is introduced into inlet 27 and falls onto the space defined between discs 17 and 19 which are being rotated at high speed by motor 31. As the material falls on the disc 19 it is, of course, carried around by this disc and is accelerated thereby. Eventually centrifugal force causes the material to begin to diffuse outwardly on disc 19. All the while the material is being accelerated until it moves outwardly and is impacted by pins 21, and is hurled from the rotor. Traveling at high speed it immediately is subjected to impact forces again as it strikes stationary pins 13. Thereafter it falls through ports 37 and into lower chamber 27 and by a combination of gravity and air blast is exhausted through outlet 35.

It has been found that if cassava root chips, of the uniform size and having the proper moisture content as described above, are fed into the milling apparatus under the prescribed conditions, a unique result is obtained. As is known, the constituents of the cassava plant roots are mainly starch, fiber, protein and certain water solubles. The starch is in cellular form and must be separated from the remaining constituents. By a proper correlation of the size, and the moisture content of the chips along with the impacting of the chips in the described apparatus a unique product may be obtained having an exceptionally high starch, extremely low protein and fiber content, in and of itself edible, usable and saleable as tapioca flour of premium quality.

The milling is thus what can be called differential milling. In other words, under the proper conditions and with the proper starting material it has been found that a considerable amount of the readily removable starch content of the cassava root can be freed from the fibrous content of the root while the fibers, though impacted, do not disintegrate but remain substantially intact. It has been found that if the chips are impacted at a velocity of from 4000 to 10,000 meters per minute the desired result is obtained. A median condition for proper operation of the initial milling phase of the process occurs at about 8400 meters per minute which will result in a satisfactory product. Below 4000 meters per minute the impact velocity is not sufficient to free a high yield of starch, while above 10,000 meters per minute the fibers begin to disintegrate, resulting in a highly contaminated intermediate product.

It will be noted that the product is not obtained directly after milling. The impact mill does differentially grind the raw material but does not separate the starch flour from the tailings. In other words 100 units of raw material fed into the device come out as 100 units of material. However, immediate dry screening of the material in screens of from 150 to 200 mesh result in the recovery of an intermediate product, tapioca flour which contains up to 95% by weight starch and which is considered a premium product in world markets.

For example, it has been found that for each 100 pounds dry weight of root, chipped and introduced into the milling phase of the process, using an impact mill having a rotor diameter of 27 inches, rotating at 3850 r.p.m., and subsequently screened, there will be obtained about 52 to 60 pounds dry weight of tapioca flour and 40 to 48 pounds of tailings. In other words, the recovery of material from the mill is 100% which, when screened through 150 to 200 mesh screen, is found to consist of from 52 to 60 pounds dry weight of tapioca flour having a starch content of 47 to 52 pounds dry weight or about 89 to 95%. The remainder of the flour by quantative analysis is found to contain about 2.8% water solubles, 1.2% protein and only 2.0% of material consisting essentially of fiber. A comparison of the flour with the same analysis of the particular starting material shows the chips per 100 pounds dry weight to be comprised of from 80 to 84 pounds per dry weight of starch, about 5.1% of water soluble substances, 2.7% protein and about 8.2% of material consisting essentially of fiber. Of course, there will be some variation depending upon the constituents of the starting material. Generally, however, the starting material will contain a substantial percentage of starch above 70%, and the results will vary accordingly. The important factor is the high recovery of starch in the initial milling phase.

It will be seen that in the first phases of the process there is formed an ungraded tapioca flour having valuable commercial properties, in that it is light in color, richer by some 10% in starch than the original material, and in usable form in that it is easily slurried and what small percentages of the fibrous material are included have little or no adverse effect on the marketability of this flour which is an intermediate product of the whole process. The economic significance of this phase of the overall process will be subsequently apparent.

Referring again to FIG. 1 it will be seen that the material resulting from the initial milling phase is carried from the first milling device 10 to a screening device 11, of suitable form. The flour and tailings are separated and the flour is pneumatically or otherwise conveyed along a path 31 wherein it may be ejected from the system at 33 or by proper manipulation of valves 35, 37 may be retained in the processing system represented by line 39 for such purposes as will be described.

Meanwhile the tailings or reject material from screen 11 are conveyed therefrom along a path to a second milling phase as represented in FIG. 1 by milling device 40. This device is similar in all ways to that described in connection with FIGS. 3 and 4 except that it may develop higher impact velocities. The increase in impact velocity will be readily effected, for example, by increasing the diameter of the rotor and increasing the r.p.m. of the device whereby the velocity of the rejected (now a raw material) tailings will be increased before impact takes place. Alternatively, the second impact phase may be carried out in precisely the same equipment as the first phase with the exception of the fact that the starting material is reject or tailings from the first milling and screening phase rather than fresh chips.

Remembering that each hundred pounds dry weight of starting material will produce from 40 to 48 pounds of tailings, an analysis of these tailings before entry of the second milling phase reveals that these tailings comprise about 31.9 pounds of starch, about 3 pounds of water solubles, 1.6 pounds of protein and 5.4 pounds of fiber. With this starting material the second phase milling and screening operation results in at least 23 pounds of flour. The starch content of the flour is quite high since the majority of the fiber is removed in the tailings from the second milling. Thus this phase results in a recovery of a further upgraded material of a still quite starch content but one which is not quite as desirable as that obtained previously because of the use of a relatively higher fiber content starting material. This higher fiber content manifests itself in a darker hue of the flour as compared with that obtained from the first milling-screening phase which contains as a percentage basis only about 4% of fibrous material. Again the result is an upgraded flour product.

From the milling and screening phase described, that is milling apparatus 40 and screening device 41, the flour is ejected from the system through a conveyor, line 43, where it may be either discharged from the system entirely through line 45 or passed into line 39 by suitable manipulation of valves 49 and 51.

It will also be noted that a suitable tap line 53 is provided in the conveyor line 39 wherein the contents of this line may be ejected entirely from the system.

As shown in FIG. 1 there is a third milling stage in the process. Again, the tailings from the immediately preceding stage are passed through a milling and screening phase represented by the schematic illustrations of a milling device 60 and screens 61. Again a higher velocity impact mill might be used if desired. However, if the milling device is the same as the two previous milling devices 10 and 40, satisfactory recovery of additional flour may be obtained. For example, the tailings resulting from the second phase dry milling comprise 18.9 pounds of material which becomes the third stage starting material. This 18.9 pounds is comprised of 11.1 pounds starch, 1.5 pounds of water solubles, 1.1 pounds of protein and 5.2 pounds of fiber. After milling and screening, a total of 8.3 pounds of flour containing a quite high 81% of starch is produced. The tailings amount to about 10.6 pounds. Again the product is upgraded.

The yield of high starch content flour begins to drop off after the third stage milling and screening phase as the above results indicate as might be expected. However, it must be noted that while the volume of flour drops off, the percentage of recovery of starch increases. This upgrading at each milling phase is the basis upon which the process is economically advantageous. In some cases it may be advisable to establish a break point after the third phase of the flour producing steps, in other cases a fourth milling and separating stage might prove economical. In all cases, however, it is essential that the milling-separating phases increase the starch to fiber ratio of the milled product. Where a third stage is used the flour is again collected and may be passed completely from the system at 63 or may be directed to the line 39, while if this is a final milling and separation the tailings are removed from the system to conveyor 98.

It will now be apparent that conveyor line 39 serves as a blending system wherein flour from each milling phase may be blended or ejected selectively from the system or passed into the starch producing, in contradistinction to the flour producing, portion of the system as may be desired.

Before considering the remainder of FIG. 1, consideration will be given to FIG. 2. This system is essentially the same as that disclosed in FIG. 1 with the exception that two milling devices are arranged in series in each milling phase before the material is separated at each phase. In all other details the systems are the same and the choice of one or the other must be determined by the fact of whether or not multiple milling at each phase results in an increase in starch content of the flour yield at each phase sufficient to warrant the use of the additional equipment. A further alternative to the arrangement of either FIG. 1 or FIG. 2 would be a simple recirculating system wherein the starting material at each phase would be recirculated twice through each milling device.

In considering FIG. 2 it will be noticed that like reference numerals with an appropriate alphabetical suffix are applied to like elements in the system of FIG. 1, Thus first phase milling apparatus 10 in FIG. 1 becomes two stage milling devices 10a and 10b of FIG. 2.

In addition, one additional arrangement is shown in FIG. 2, which arrangement is also usable with the single stage milling phases of FIG. 1. This arrangement is brought about by the upgrading effect produced in each differential milling and separation phase, and resides in the fact that rejects or tailings from other processes, such as water separation processes, etc., may be added to rejected material obtained from phase one and phase two milling in the process described and shown herein to produce additional flour which may be introduced into the starch recovery phase.

Of course, all rejected material from other processes might not be usable but a great quantity of it does contain recoverable starch which may be recovered by producing an upgraded flour by impact milling as described above.

Further, it is quite feasible to use more milling phases than three as shown, however, for illustrative purposes three are sufficient. The "cut off" point, where further milling is not desirable, will depend upon the adequate recovery of sufficiently upgraded flour to warrant the additional milling.

The versatility of the flour producing portion of the system for carrying out the method defining the invention is readily apparent. The initial upgraded flour product from the first milling separating step will, in all cases, except for unusual circumstances, be removed from the system as a flour and as such at a premium price because of its high starch content of up to 95%. This flour may be sold at a price which is high enough to cover cost of operating the entire process such that the remaining extraction phases are practically supported by this single product and the yields from the remainder of the process are substantially cost free insofar as raw materials are concerned.

On the other hand it is possible to blend the flour from each milling phase in the system by passage through the conveying line 39 to blending tank 100. The conveying line 39 in turn may be tapped at various phases of the processing operation to remove various intermediate products comprising flour of selected starch and fiber content. This is a very remote possibility however, for the first phase product because in practically all case, the first phase milling will produce a product of such economic value that it will be removed from the system, while the products from the successive milling phases thereafter will be directed to the starch recovery phase of the system.

Returning back to FIG. 1 it will be seen that flour from either conveying line 39 or blending tank 100, by proper manipulation of valves 111 and 72 may be directed to a slurry tank 81. This tank 81 may be in the form of a tub-like container provided with a simple low speed agitator 82 driven from a power source such as a motor 83. Preferably this slurry tank is provided with water from two sources, fresh water line 107 and that water which is recovered from various other stages in the starch recovery phase of the system and which is directed to the slurry tank through line 87.

It has been found that it is necessary to retain the flour and water under agitation for a period of from only 1 to 2 minutes to assure complete dispersion of the starch in the water. In some cases it may be found advantageous to add small quantities of a dispersing agent to hasten the slurrying of the flour. At the same time, preservatives or other materials may also be added at this step.

From the slurry tank 81 the slurry may be pumped through a line 89 either directly to a starch table, centrifugal separator 90 or similar device or optionally to a wet milling operation 104 or to a fermentation tank 99. Suitable valves 91, 93, 95 and 97 will permit of selective direction of the slurry to either or both of the devices 90 or 104 or tank 99 as may be desirable. The function of the wet milling device 104 is to thoroughly loosen the starch from the fibers contained therein while the function of the separator 90 is to separate the starch from the fiber and protein and, of course, the water solubles are dissolved in the water and are separated from the starch as the processing proceeds. The function of a fermentation step is obvious and well known.

From the separating device 90 the rejects including fiber and protein are carried by a suitable conveying system 96 to join the system 98 carrying rejects from the last milling phase in the flour producing step in the system. This material being high in fiber content and also protein is adaptable as an animal feed.

The recovered starch from the separating screen 90 is then passed through a series of hydrocyclone separators 101, 102, 103 in series where purification is continued until the starch is exhausted from the system through line 105 to dryer 110. The starch is then dried and may be sold as pure starch.

Referring to the hydrocyclone purification it will be seen that fresh water is admitted to the system from a line 107 first into hydrocyclone 103, is recovered therefrom along with the fines separated from the starch and directed to the preceding hydrocyclone 102, and so forth until it is passed through line 87 back to the slurry tank 81. In this way a maximum amount of starch is recovered. In addition, fresh water, "make up" water, is added to the slurry tank through line 107 and obviously either line 87 or 107 can be tapped to provide "make up" water at any stage it may be required, perhaps some at each of the hydrocyclones 101, 102 and 103.

Before recapitulating on the advantages of the novel method and system for recovering starch from tubers such as cassava and the like, it should be noted that reference has been made from time to time to lines or paths of flow on conveyor systems such as line 39, line 98, etc. It will be appreciated that this terminology is not intended to be limiting, but merely to define "flow" paths through the system. Obviously various means may be used to convey materials throughout the system; for example, pneumatic conveyors for flour, belt conveyors for tailings or rejects, and, equally obviously, pipes for fluids. The definition of the various paths of flow as "lines" or conveyors is intended to define the appropriate means for the material being so directed.

Having described FIG. 1 in its entirety, consideration will be given to the latter phase, i.e., the starch recovery and its contribution to the overall system and method as well as the pronounced effect of the milling and flour producing phases on the starch system.

It will be obvious of course that the overall system is highly efficient, up to 95% efficient, in extracting every available amount of starch from the root harvest. In addition, the first step including the chipping and dry milling conditions the material passed into the recovery phase to such an extent that the material is exposed to water only the absolute minimum amount of time. This factor is extremely important in that degradation of the starch is reduced to an absolute minimum. For example, the flour can be slurried in from 1 to 2 minutes in slurry tank 81. This is a far removed concept from previous systems and methods wherein prolonged steeping periods are required before processing can begin, and is obviously advantageous from the economy standpoint as well as productive of a far superior quality starch in a minimum of processing time.

FIG. 2 has been described as a multi-stage for producing phase, and aside from the differences referred to hereinabove, is the same as FIG. 1 since from blending tank 100 the starch recovery phase is the same as that shown in FIG. 1. FIG. 2 is believed to clearly emphasize the versatility of the process and the system which may be economically used to carry out the process.

Having thus described the invention process, system of handling the root crop, and at least one novel product which is produced, it becomes apparent that various modifications and changes therein will be apparent to one skilled in the art. Such modifiction and changes fall within the spirit and scope of the described material which is limited only as defined in the claims, wherein what is claimed is:

1. A root crop flour characterized in that it is comprised from 89 to 95% starch on a dry basis and no more than 5 to 11% of additional material on a dry basis which is comprised essentially of root crop fiber, protein and water soluble materials, said flour having been produced by milling dry, uniform chips of root crops by impacting said chips in an impact mill at velocities of greater than 4000 meters per minute and not greater than 10,000 meters per minute.

2. A root crop flour as defined in claim 1 wherein said flour is tapioca flour and said root crops are cassava roots.

3. A method of processing root crops comprised essentially of starch and fiber, comprising the steps of chipping the harvested root, drying the chips to a moisture content of less than about 15%, impact milling the dried chips at a velocity of not less than about 4000 nor greater than about 10,000 meters per minute, separating the products of milling into high starch content flour and rejected material, removing the flour, thereafter treating the rejected materil to remove starch therefrom.

4. A method of processing root crops as defined in claim 3 wherein the root crops are chipped into a starting material of a thickness not in excess of 3 mm.

5. A method of processing root crops as defined in claim 3 wherein the chips are dried to a moisture content of from 10% to 15% prior to milling.

6. A method of processing root crops as defined in claim 3 wherein said rejected material is treated by the steps of successive milling and separation of flour and further rejected material, therefrom removing the flour obtained after each milling, blending the removed flour with water and thereafter separating fiber, protein and water soluble constituents from the flour.

7. A method of treating root crops comprised essentially of starch and fiber, comprising the steps of chipping the roots to form uniform chips therefrom of not greater than .3 mm., drying the uniform chips to a moisture content of from 10 to 15% of water, thereafter impacting the dried chips, and separating the resultant products into a flour containing up to 95% of starch and into a re-millable rejected material, removing the flour, thereafter impacting the rejected material to obtain additional flour therefrom, thereafter treating the additionally obtained flour to obtain a pure starch therefrom, said treating including the steps of slurrying the flour with water, separating the starch from the flour, and expelling rejected material while drying the starch thus obtained.

8. A method of treating chips of root crops containing less than about 15% moisture, comprised essentially of starch and fiber, comprising the steps of impact milling the chipped roots at a velocity of not less than about 4000 nor greater than about 10,000 meters per minute, separating the resultant material comprised of starch, fiber, protein and water solubles, removing the flour from further processing, successively milling and separating the rejected material to obtain further flour and rejected material, removing the rejected material obtained after the milling and separating phases, thereafter treating all of the flour obtained from the originally rejected material to obtain starch therefrom.

9. A method as defined in claim 8 wherein the milling is effected by recirculating the root chips through the milling steps prior to separation of flour and rejected material.

10. A method as defined in claim 8 wherein each of the mentioned milling steps is carried out in a plurality of milling operations prior to separation of the milled product into flour and rejected material.

11. A system for processing root crops comprised essentially of starch and fiber, comprising a flour producing phase and a starch producing phase, means for introducing root crop chips into said first mentioned phase, means for impact milling and separating said chips to produce a flour product and rejected material, means for impact milling and separating the rejected material to recover additional flour therefrom, means for removing the flour product from the flour producing phase and means for introducing said additional flour into a starch recovery phase, said last mentioned phase including means for slurrying the flour in water, means for receiving the slurry and separating starch from the rejectable material contained in said additional flour, dryer means receiving said separated starch and means for collecting rejected material from said flour producing phase and said starch producing phase.

12. A system for processing root crops as defined in claim 11, wherein said milling means are comprised of a series of impact mills arranged such that a separation step for separating flour from rejected material is interposed between any given milling phase and the next succeeding milling phase whereby after the initial milling each successive milling phase receives rejected material as a raw material.

13. A system for processing root crops as defined in claim 12 wherein said milling means acts upon its respective raw material twice before the material is separated.

14. The method of claim 3 in which the root crops are cassava roots.

15. The method of claim 7 in which the root crops are cassava roots.

References Cited in the file of this patent

UNITED STATES PATENTS

| | | |
|---|---|---|
| 1,304,679 | Gridley | May 27, 1919 |
| 2,464,212 | Carter | Mar. 15, 1949 |
| 2,556,322 | Eckers | June 12, 1951 |
| 2,651,470 | Dodds et al. | Sept. 8, 1953 |

UNITED STATES PATENT OFFICE
CERTIFICATE OF CORRECTION

Patent No. 2,987,424 June 6, 1961

Jay E. Olnick

It is hereby certified that error appears in the above numbered patent requiring correction and that the said Letters Patent should read as corrected below.

Column 6, line 5, for "ungraded" read -- upgraded --; line 49, after "quite" insert -- high --; column 8, line 19, for "case" read -- cases --; column 9, line 24, for "pronouned" read -- pronounced --.

Signed and sealed this 6th day of March 1962.

(SEAL)
Attest:

ERNEST W. SWIDER
Attesting Officer

DAVID L. LADD
Commissioner of Patents